United States Patent [19]

Nichols et al.

[11] 3,919,857
[45] Nov. 18, 1975

[54] APPARATUS FOR MELTING ICE IN A GASOLINE VAPOR RECOVERY SYSTEM

[75] Inventors: Richard A. Nichols, Corona Del Mar; Henry A. Swindler, Tustin, both of Calif.

[73] Assignee: Parker-Hannifin Corporation, Cleveland, Ohio

[22] Filed: Jan. 9, 1974

[21] Appl. No.: 431,860

[52] U.S. Cl............ 62/272; 126/343.5 R; 141/329; 220/86 R; 220/88 B; 239/548
[51] Int. Cl.² ........................................ F25D 21/00
[58] Field of Search......... 141/329; 220/86 R, 88 B; 239/548; 55/160; 62/81, 272, 45, 54; 126/343.5 A, 343.5 R

[56] References Cited
UNITED STATES PATENTS

| | | | |
|---|---|---|---|
| 2,602,465 | 7/1952 | Goehring | 220/86 R |
| 3,209,745 | 10/1965 | Glaser et al. | 126/343.5 R |
| 3,590,559 | 7/1971 | Bragg et al. | 55/160 |

Primary Examiner—William F. O'Dea
Assistant Examiner—Ronald C. Capossela
Attorney, Agent, or Firm—John N. Wolfram

[57] ABSTRACT

A method and apparatus for melting ice in the bottom of an absorber in a vapor recovery system wherein the absorber also contains cold gasoline. The method includes the steps of introducing warm gasoline into the cold gasoline in a manner to cause the resulting mixture to have a temperature above the melting point of ice and to circulate about the ice and cause melting of the same. The apparatus for carrying out the method includes a header to carry warm gasoline into the absorber tank below the level of cold gasoline therein and the header having openings for discharging the warm gasoline into the cold gasoline in a non-vertical direction generally parallel to a portion of the tank side wall and also in a direction slanting toward the bottom of the tank whereby to cause circulation of the mixture of warm and cold gasoline into contact with the ice for melting the same.

3 Claims, 3 Drawing Figures

APPARATUS FOR MELTING ICE IN A GASOLINE VAPOR RECOVERY SYSTEM

BACKGROUND OF THE INVENTION

In gasoline vapor recovery systems such as disclosed in U.S. Pat. No. 3,771,317, gasoline vapor collected from a tank truck during filling thereof with liquid gasoline is converted to liquid in an absorber and is returned to the main supply tank, thus avoiding loss of the gasoline vapor to atmosphere and consequent pollution of the latter. Cold gasoline having a temperature below the freezing point of water is introduced to the absorber to facilitate conversion of the gasoline vapor to liquid form. The gasoline vapor entering the absorber from the tank truck carries with it some water vapor. Because the temperature in the absorber is normally considerably less than 32°F, the water vapor will freeze to form snow and ice in the absorber. This ice must be removed periodically in order to maintain efficient operation of the vapor recovery system.

Removal of ice from the absorber is a troublesome problem and various methods for doing so have been proposed, including the practice of periodically warming the cold liquid gasoline in the absorber for melting the ice so that it can be drawn off as water. During the time that the cold liquid gasoline is being warmed, the vapor recovery system must be either shut down, which may be for 24 hours or more, or the system must be operated at reduced efficiency during the warming period. To shorten the time for melting the ice, some vapor recovery systems use heaters for warming the gasoline in the absorber, but heaters are expensive to operate and introduce safety hazards.

SUMMARY OF THE INVENTION

The present invention provides a method and apparatus for shortening the time that it takes to melt ice formed in an absorber of a vapor recovery system without the use of special heaters for warming the gasoline in the absorber. This is done by circulation of warm gasoline taken from a part of the system where the gasoline is above the freezing point of water into the bottom of the absorber tank for melting ice that has collected in this area. Such circulation is accomplished by the use of a header having a plurality of nozzles for discharging streams of the warm gasoline into the cold gasoline to mix therewith and in a manner so that the mixture will circulate within the tank to contact and melt the ice.

The nozzles are preferably located adjacent the side wall of the tank and are directed both slantingly downward toward the tank bottom and generally parallel to the tank side wall for causing circulation of the mixture into contact with the ice for melting the same.

DETAIL DESCRIPTION

Figure 1:
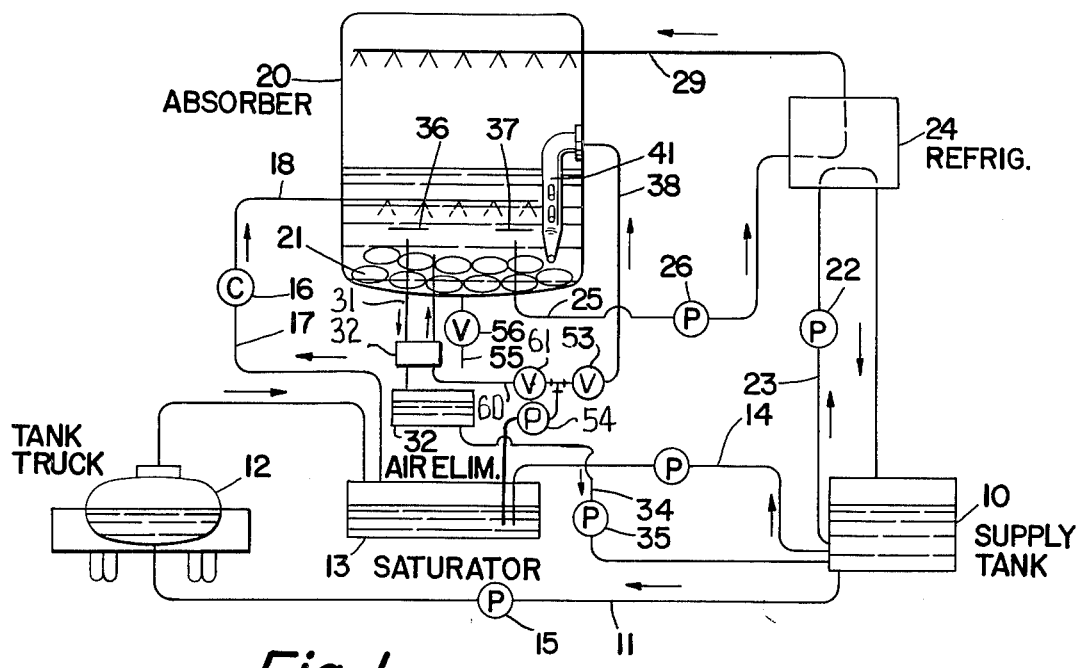
FIG. 1 is a schematic view of a typical vapor recovery system.

In the gasoline vapor recovery system of FIG. 1, which is simplified for purposes of illustration, liquid gasoline from a supply tank 10 is pumped through a conduit 11 by a pump 15 into a tank truck 12. As liquid gasoline enters tank truck 12, gasoline vapor is expelled from the tank truck into a saturator 13 which has been supplied with liquid gasoline from tank 10 through line 14 and thus is rendered non-explosive. Saturated vapor from tank 13 is then directed to a compressor 16 via a conduit 17 and delivered under pressure through a conduit 18 into an absorber tank 20 through a series of openings in conduit 18.

Meanwhile, another portion of liquid gasoline is forced by a pump 22 through a conduit 23 from supply tank 10 to a refrigerator unit 24. Liquid gasoline is drawn from absorber 20 through a conduit 25 by a pump 26 and is cooled by the refrigeration unit 24. It is then returned to the absorber 20 by spraying it into the latter from a conduit 29 for assisting in the conversion of gasoline vapor within the absorber to liquid. Excess liquid gasoline within the absorber is drawn off through a conduit 31 through a heat exchanger 33 to an air eliminator 32 from which it is returned to the supply tank 10 through a conduit 34 by a pump 35.

Figure 3:
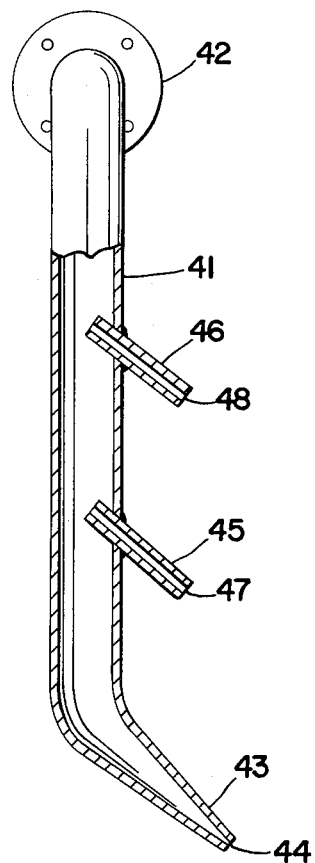
FIG. 3 is a vertical cross section taken along the line 3—3 of FIG. 2.

Conduits 25 and 31 extend upward within absorber 20 to a point well above the bottom of the tank but below the normal level of liquid gasoline therein and are open to the interior of the absorber just below laminar flow plates 36, 37. Another conduit 38 has a valve 53 and a pump 54 therein and has one of its ends below the level of liquid gasoline in saturator 13. The other end of conduit 38 is welded to absorber tank 20 and passes through an opening 40 through the absorber. This end of conduit 38 is welded to a flange 39 that is bolted to a flange 42 on header 41. Branching from conduit 38 is another conduit 60 having a valve 61 therein and which passes through heat exchanger 33 to absorber 20. Header 41 extends vertically within absorber 20 toward the bottom of the latter. This header, which is better illustrated in FIGS. 2 and 3, has its lower end formed into a discharge nozzle 43 with a relatively small opening 44 therein. Spaced vertically from nozzle 43 and from each other are additional nozzles 45, 46 that are in the form of tubes that pass through the wall of the header and are welded thereto. These nozzles 45, 46 have relatively small openings or passages 47, 48 therethrough and one end of each nozzle tube projects into header 41 so that the inner ends of openings 47, 48 are radially spaced from the inner wall of the header and face toward the upstream end of the header.

Figure 2:
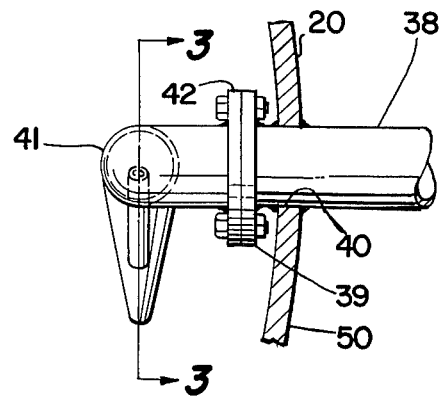
FIG. 2 is a top view of a header and nozzles for injecting warm gasoline into the cold gasoline in the absorber.

As viewed in FIG. 2, nozzles 43, 45 and 46 are pointed in a direction generally parallel to the circular side wall 50 of absorber 20 so that gasoline flowing from header 41 through openings 44, 47 and 48 will initially flow in this generally parallel direction. As viewed in FIG. 3, nozzles 43, 45 and 46 are also slanted downwardly toward the tank bottom so that in addition to flowing parallel to the absorber side wall, the gasoline emitted from the nozzles flows slantingly toward the bottom of the absorber. Although three nozzles are illustrated in the drawings, the number may be varied and in some installations a single nozzle may be sufficient. Also, even though header 41 is shown extending vertically in the tank, it may have some other position so long as the nozzles are mounted so that they will cause thorough mixing and circulation of the liquid gasoline within the absorber.

During typical operation of the system shown in FIG. 1, refrigerator 24 may, for example, cool the liquid gasoline drawn from absorber 20 through conduit 25 to about −10°F for redelivery to the absorber through conduit 29. However, due to heat loss in the absorber and the introduction of relatively warm gasoline vapor through conduit 18, the normal temperature of the body of liquid gasoline within the absorber may be about −6°F. With these temperatures, water vapor coming into the absorber through conduit 18 turns to snow which falls to the bottom of the absorber to form an ice layer as indicated at 21.

When enough ice has formed so that additional ice will impair efficient functioning of the system, valve 53 is opened for directing relatively warm liquid gasoline from saturator 13 and delivering the same to the absorber via line 38, header 41 and nozzles 43, 45 and 46. The temperature of the gasoline in saturator 13 will vary with ambient temperatures and, for example, may be on the order of 70° to 80°F in summer time or in warm climates. The warmer the ambient temperature the quicker ice will form in the absorber, but also the higher the temperature of the gasoline in the saturator.

The warm liquid gasoline discharged through nozzles 43, 45 and 46, being directed both downwardly and generally parallel to the adjacent side wall portion of the absorber tank, causes the body of cold liquid that is within the absorber to circulate and to mix with the warm gasoline. As the temperature of the mixture rises to above 32°F and comes into contact with the ice the latter begins to melt. The resulting water will remain at the bottom of the absorber because its specific gravity is greater than that of the liquid gasoline, and the water may then be drawn off through a drain pipe 55 controlled by a valve 56. When drawing off the water has been completed, valve 56 is closed and pump 53 is deactivated and normal operation of the vapor recovery system is then resumed.

During the time that warm gasoline is being introduced through header 41 for melting the ice as aforesaid, the vapor recovery system may be continued in operation for liquifying gasoline vapor recovered from a tank truck 12, but the system will not be operating at its best efficiency because of the higher temperatures of the liquid gasoline and vapor space in the absorber. Whether or not the vapor recovery system is operated during the time that the ice is being melted, the length of time in which the system is either shut down or operating at reduced efficiency is shortened because of the efficient manner in which nozzles 43, 45 and 46 mix the warm gasoline with the cold and cause circulation of the mixture into contact with the ice.

We claim:

1. In a tank containing a supply of cold liquid gasoline that has a temperature below the freezing point of water, an apparatus for melting ice which forms at the bottom of said tank comprising: a hollow header having a series of nozzle means spaced along the longitudinal axis of said header and projecting sidewards in substantially the same direction with their axes inclined relative to the longitudinal axis of the header to spray relatively warm liquid gasoline having a temperature above said freezing point into said supply of sand cold gasoline to mix therewith whereby the temperature of the mixture is above said freezing point, said header having an end near the bottom of the tank extending away from the longitudinal axis in diminishing diameter to form an end nozzle which projects at substantially the same angle and direction as said series of nozzle means to direct the flow of said warm liquid gasoline passing through said end nozzle towards the bottom of the tank.

2. The apparatus of claim 1 in which there is a means for mounting the header in a fixed position within the tank with said longitudinal axis in a vertical position, and said series of nozzle means and said end nozzle when the header is so mounted are further oriented close to the wall of the tank in a direction substantially parallel to the wall for directing the warm gasoline in a non-vertical direction substantially parallel with the side wall to circulate said mixture into contact with said ice for melting the same.

3. The apparatus of claim 1 in which said series of, nozzle means include inner portions extending into a chamber formed by said hollow header, and said nozzle means and, said inner portions having openings therethrough, and the inner ends of said openings face an upstream portion of said chamber and are laterally spaced from the interior wall of said chamber.

* * * * *